March 10, 1931. E. HÄGGLUND 1,795,557
METHOD OF TREATING BLACK LIQUOR OBTAINED IN THE SODA PULP PROCESS
Original Filed July 13, 1925
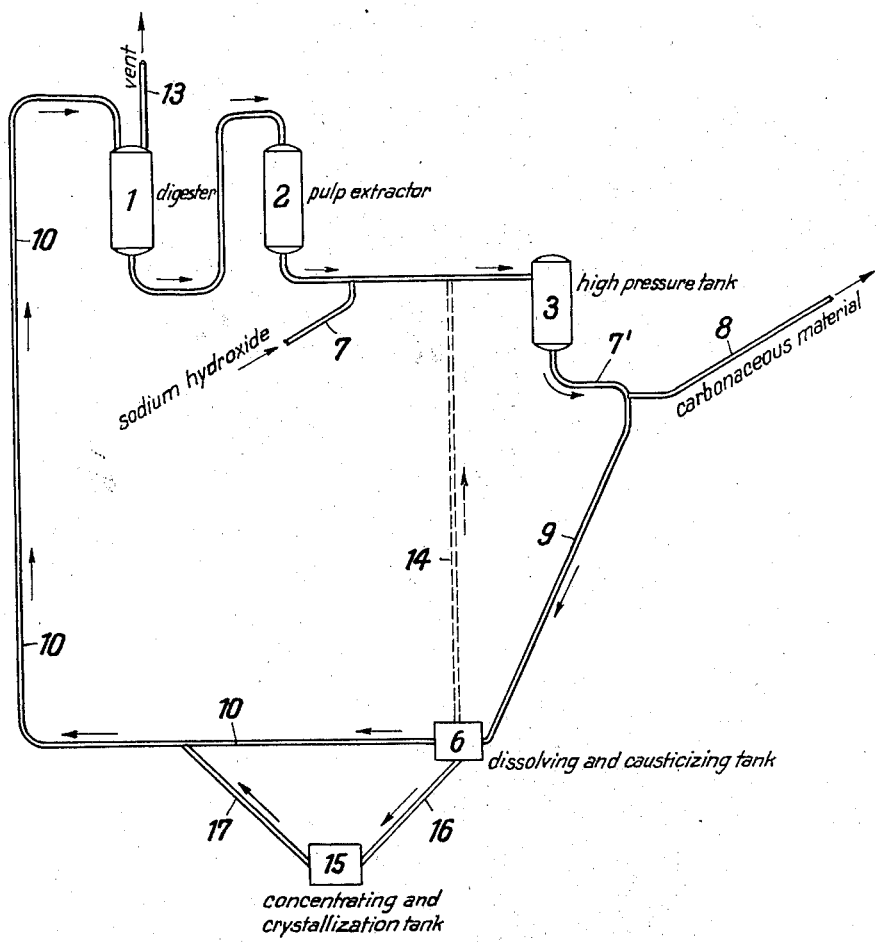
Inventor:
Erik Hägglund
by Byrnes, Townsend & Potter
his attorneys Patented Mar. 10, 1931

1,795,557

UNITED STATES PATENT OFFICE

ERIK HÄGGLUND, OF ABO, FINLAND

METHOD OF TREATING BLACK LIQUOR OBTAINED IN THE SODA-PULP PROCESS

Original application filed July 13, 1925, Serial No. 43,367, and in Germany July 16, 1924. Divided and this application filed January 10, 1930. Serial No. 419,897.

This invention has reference to the treatment of black liquor obtained in the manufacture of wood fibre by the soda process and has for its purpose to obtain therefrom in an economical manner valuable products, particularly sodium acetate and methyl alcohol, in good yield. To this end according to this invention the black liquor is subjected to a combination of treating steps comprising heat and pressure treatment adapted to precipitate the main portion of organic substances contained therein as carbonaceous and pitchy material and crystallization of the liquor after separation from the carbonaceous and pitchy substance and after recausticizing and concentration.

The heat and pressure treatment at about 350 degrees centigrade and a corresponding pressure between 150 and 200 atmospheres is a well known step in the black liquor treatment, however, if used in conformity with this invention as a preliminary step which is followed by crystallization of the recausticized and concentrated liquor, then it assists in economically obtaining such valuable products as sodium acetate and methyl alcohol in good yield.

It would hardly pay to recausticize the whole liquor from which organic matter has been removed by heat and pressure treatment and to concentrate it for crystallization. Therefore it is preferred to return a portion of the recausticized liquor to the digester for being used as cooking liquor in connection with fresh portions of chips.

The is still a further point which is of importance for securing good yields particularly in methyl alcohol. This is the degree of alkalinity of the liquor introduced into the high pressure tank.

It has been found that by raising the degree of alkalinity of the black liquor to be subjected to heat and high pressure over that which is preferably used for the cooking liquor an increase in the yield of methyl alcohol can be obtained.

The preferred means of carrying the invention into effect will be more particularly described hereinafter with reference to the accompanying drawing showing a diagram of a manufacturing plant for the execution of the invention.

In the drawing 1 indicates a pulp cooking digester, 2 is a pulp extractor, 3 a high pressure tank, 6 indicates a causticizing tank fed through conduit 9 with the liquor coming through conduit 7' from high pressure tank 3 after removal therefrom of carbonaceous and pitchy material through conduit 8. 10 is a conduit connecting causticizing tank 6 with digester 1 for reintroducing recausticized liquor into the digester. 7 is a conduit for introducing sodium hydroxide in solution into the system; 13 is a vent for blowing off vapors from the digester. 15 is a concentrating and crystallizing tank and 16 and 17 conduits, the former connecting said tank 16 with the recausticizing tank 6 and the latter for connecting tank 15 with conduit 10.

The dotted line 14 indicates a conduit which, if desired, may be provided for allowing liquor from the recausticizing tank 6 to be introduced into the conduit leading from the pulp extractor 2 to the high pressure tank.

Example of operation of the process:

The pulp-cooking digester 1 is fed in usual manner with chips of wood and caustic cooking liquor, the proportion being so chosen that in normal operation each 1000 kilograms of dry chips are acted on by 3000 kgs. of liquor containing 250 kgs. of sodium hydroxide and 200 kgs. of sodium acetate. The chips are cooked for about 6 hours at a temperature of 165° C. The cooking process being finished, the content of the digester is blown by steam into the pulp separator 2 where the black liquor is separated from the fiber; the yield is about 450 kgs. of cellulose and 4000 kgs. of black liquor. The black liquor is pumped into the high pressure tank 3 where it is heated up to about 350° C. corresponding to a pressure of about 200 atmospheres. The heat and pressure treatment effects a decomposition of the organic substances contained within the black liquor forming thereby carbonaceous material in the form of a tarry or pitchy sediment in quantity of about 200 kgs. At the same time acetic acid is formed, which latter combines with some of the sodium of the liquor so as to form sodium acetate dissolved in the liquor in a quantity of about 100 kgs.; furthermore, about 20 kgs. of methyl alcohol are formed, together with gases, which are drawn off. The methyl alcohol can be recovered from the gases by condensation.

The carbonaceous material formed by the heat and pressure treatment within the high pressure tank 3 is separated from the liquid which now is of comparatively light color and which mainly contains, besides about 300 kgs. of sodium acetate, sodium carbonate and a certain proportion of methyl alcohol. The separation of the liquor from the tarry or pitchy sediment can be effected by simple decantation.

The separated liquid is introduced through conduit 9 into the causticizing tank 6 where it is causticized by interaction with lime. About three quarters of the recausticized liquor is returned by conduit 10 to the digester 1, whereas the last quarter is introduced into the concentrating and crystallizing tank 15. The crystallization yields in continuous operation of the plant about 130 kgs. of sodium acetate contaminated only slightly by sodium hydroxide on each 1000 kgs. of dry chips. The prescribed condition of the cooking liquor (250 kgs. of sodium hydrate and 200 kgs. of sodium acetate in each 3000 kgs. of total liquor) and the uniform quantity thereof, are maintained by the introduction into the cycle of a suitable quantity of sodium hydrate through conduit 7, as before mentioned.

It may sometimes be advisable, particularly with a view to securing high yields in methyl alcohol, to increase the alkalinity of the black liquor prior to its introduction into the high pressure tank 3 over that which is required for recovering therefrom white liquor of normal concentration for decomposing wood within digester 1. To this end a portion of the causticized liquor from tank 6 may be introduced into the black liquor coming from pulp separator 2 on its way to the high pressure tank 3. This modification is indicated on the drawing by the provision of a conduit 14 shown in dotted lines.

What I claim is:—

1. The method of treating and utilizing the black liquor obtained in the soda-pulp process, which consists in submitting said liquor to a heat and pressure treatment adapted to precipitate the main portion of organic substances contained therein as carbonaceous and pitchy material, then separating the liquor from the precipitate, causticizing said liquor leaving the acetate therein substantially unchanged, concentrating at least a portion thereof and allowing the sodium acetate to crystallize out, returning causticized liquor to a pulp-cooking digester and recovering crystallized sodium acetate and volatile products.

2. The method of treating and utilizing the black liquor obtained in the soda-pulp process, which consists in submitting said liquor to a heat and pressure treatment adapted to precipitate the main portion of organic substances contained therein as carbonaceous and pitchy material, then separating the liquor from the precipitate, causticizing said liquor leaving the acetate therein substantially unchanged, concentrating at least a portion thereof and allowing the sodium acetate to crystallize out, returning as well the non-concentrated portion of the causticized liquor as the mother-lye of crystallization to a pulp-cooking digester and recovering volatile products.

3. The method of treating and utilizing the black liquor obtained in the soda-pulp process, which consists in increasing the alkalinity of said liquor, submitting said liquor to a heat and pressure treatment adapted to precipitate the main portion of organic substances contained therein as carbonaceous and pitchy material, then separating the liquor from the precipitate, causticizing said liquor, leaving the acetate therein substantially unchanged, concentrating at least a portion thereof and allowing the sodium acetate to crystallize out, returning causticized liquor to a pulp-cooking digester and recovering crystallized sodium acetate and volatile products.

4. The method of treating and utilizing the black liquor obtained in the soda-pulp process, which consists in increasing the content of sodium hydrate in such liquor, submitting said liquor to a heat and pressure treatment adapted to precipitate the main portion of organic substances contained therein as carbonaceous and pitchy material, then separating the liquor from the precipitate, causticizing said liquor leaving the acetate therein substantially unchanged, concentrating at least a portion thereof and allowing the sodium acetate to crystallize out, returning causticized liquor to a pulp-cooking digester and recovering crystallized sodium acetate and volatile products.

5. The method of treating and utilizing the black liquor obtained in the soda-pulp process, which consists in adding to said liquor an amount of sodium hydrate sufficient to supply substantially the loss of alkali produced in the repeated treatment of the fibrous material with such liquor, submitting said liquor to a heat and pressure treatment adapted to precipitate the main portion of organic substances contained therein as carbonaceous and pitchy material, then separating the liquor from the precipitate, causticizing said liquor leaving the acetate therein substantially unchanged, concentrating at least a portion thereof and allowing the sodium acetate to crystallize out, returning causticized liquor to a pulp-cooking digester and recovering crystallized sodium acetate and volatile products.

6. The method of treating and utilizing the black liquor obtained in the soda-pulp process, which consists in submitting said liquor to a heat and pressure treatment adapted to precipitate the main portion of organic substances contained therein as carbonaceous and pitchy material, then separating the liquor from the precipitate, causticizing said liquor leaving the acetate therein substantially unchanged, concentrating a portion of the causticized liquor and allowing sodium acetate to crystallize out, using another portion of the causticized liquor to increase the alkalinity of the black liquor and a further portion to act upon pulp-yielding fibrous material and recovering crystallized sodium acetate and volatile products.

In testimony whereof, I affix my signature.

ERIK HÄGGLUND.